(12) United States Patent
Wölk et al.

(10) Patent No.: US 8,759,249 B2
(45) Date of Patent: Jun. 24, 2014

(54) METHOD FOR THE PRODUCTION OF NANOCRYSTALLINE NICKEL OXIDES

(75) Inventors: Hans-Jörg Wölk, Rosenheim (DE); Alfred Hagemeyer, Bad Aibling (DE); Frank Großmann, München (DE); Silvia Neumann, Großkarolinenfeld (DE)

(73) Assignee: SUED-Chemie IP GmbH & Co. KG, Munich (DE)

( * ) Notice: Subject to any disclaimer, the term of this patent is extended or adjusted under 35 U.S.C. 154(b) by 402 days.

(21) Appl. No.: 12/994,963

(22) PCT Filed: May 29, 2009

(86) PCT No.: PCT/EP2009/003882
§ 371 (c)(1),
(2), (4) Date: Mar. 21, 2011

(87) PCT Pub. No.: WO2009/144034
PCT Pub. Date: Dec. 3, 2009

(65) Prior Publication Data
US 2011/0201847 A1    Aug. 18, 2011

(30) Foreign Application Priority Data
May 30, 2008   (DE) .......................... 10 2008 026 094

(51) Int. Cl.
*B01J 23/00*    (2006.01)
*B01J 23/32*    (2006.01)
*B01J 23/58*    (2006.01)
*B01J 23/72*    (2006.01)
*C01G 51/02*    (2006.01)
*C01G 53/04*    (2006.01)

(52) U.S. Cl.
USPC .......... 502/337; 502/315; 502/324; 502/330; 502/331; 502/335; 423/594.19; 423/594.3

(58) Field of Classification Search
USPC ................ 502/315, 324, 330, 331, 335, 337; 423/594.3, 594.19
See application file for complete search history.

(56) References Cited

U.S. PATENT DOCUMENTS

| | | | |
|---|---|---|---|
| 5,523,500 A * | 6/1996 | Cheminal et al. ............. 570/169 |
| 5,600,030 A | 2/1997 | Deckers et al. |
| 5,958,825 A * | 9/1999 | Wulff-Doring et al. ...... 502/300 |
| 6,303,535 B1 * | 10/2001 | Scholz et al. ................. 502/315 |
| 7,700,068 B2 * | 4/2010 | Shen et al. ............... 423/594.19 |
| 8,110,173 B2 * | 2/2012 | Bahari Molla Mahaleh et al. ........................ 423/594.19 |
| 2003/0050188 A1 * | 3/2003 | Ovshinsky et al. ........... 502/300 |
| 2008/0139383 A1 * | 6/2008 | Ryu ............................... 502/327 |
| 2008/0247931 A1 | 10/2008 | Domesle et al. |
| 2009/0325794 A1 | 12/2009 | Wölk et al. |
| 2010/0015446 A1 | 1/2010 | Wölk |
| 2011/0143088 A1 * | 6/2011 | Richards et al. .............. 428/135 |

FOREIGN PATENT DOCUMENTS

| | | |
|---|---|---|
| DE | 101 09 892 A1 | 9/2002 |
| DE | 10 2006 032452 A1 | 1/2008 |
| WO | WO 2006/027270 A2 | 3/2006 |
| WO | WO-2006027270 A2 | 3/2006 |
| WO | WO 2008/021256 A2 | 2/2008 |
| WO | WO-2008021256 A2 | 2/2008 |
| WO | WO 2008/028681 A2 | 3/2008 |

OTHER PUBLICATIONS

International Search Report for PCT/EP2009/003882 mailed Mar. 9, 2009.

* cited by examiner

*Primary Examiner* — Patricia L Hailey
(74) *Attorney, Agent, or Firm* — Walter Ottesen P.A.

(57) ABSTRACT

A method for the production of nanocrystalline nickel oxides as well as the nickel oxides produced by the method according to the invention and the use thereof as catalyst following reduction to nickel metal, in particular for hydrogenation reactions.

14 Claims, No Drawings

METHOD FOR THE PRODUCTION OF NANOCRYSTALLINE NICKEL OXIDES

CROSS REFERENCE TO RELATED APPLICATIONS

This is a National Phase application of PCT application number PCT/EP2009/003882, filed May 29, 2009, which claims priority benefit of German application number DE 10 2008 026 094.0, filed May 30, 2008, the content of such applications being incorporated herein by reference.

FIELD OF THE INVENTION

The present invention relates to a method for the production of nanocrystalline nickel oxides as well as the nickel oxides produced by the method according to the invention and the use thereof as catalysts and precursors and components for catalysts, in particular for hydrogenation reactions.

BACKGROUND OF THE INVENTION

Nickel catalysts are known to a person skilled in the art e.g. under the name Raney nickel. This is a nickel-aluminium alloy which is converted to the activated Raney nickel by dissolving much of the aluminium with caustic soda solution. Due to the resulting porous structure and therefore large BET surface area, Raney nickel has a high catalytic activity, in particular during hydrogenation reactions. Commercially available Raney nickel has an average nickel surface area of up to 100 $m^2/g$. However, a disadvantage when using Raney nickel is that, because of its large BET surface area and reactivity, it can decompose spontaneously and explosively in air. The use of Raney nickel is therefore problematic in particular when used on an industrial scale.

Instead of Raney nickel as catalyst, it is also possible to use nickel oxide, which can be converted into an active nickel catalyst by reduction, as precursor. However, nickel oxide which is produced according to methods known in the state of the art has too small a BET surface area, with the result that the catalytic activity of the nickel which is obtained from the nickel oxide by reduction is frequently inadequate for chemical conversions.

DESCRIPTION OF THE INVENTION

An object of the present invention was therefore to provide a method in which nickel oxide with as large as possible a BET surface area and high catalytic activity (after reduction to nickel metal) can be obtained. The method is also to be simple to carry out and inexpensive.

An object is achieved by a method for the production of a nanocrystalline nickel oxide material comprising the steps of
a) the introduction of a nickel starting compound into a reaction chamber by means of a carrier fluid, wherein the nickel starting compound is an inorganic nickel salt and wherein the nickel starting compound is introduced into the reaction chamber in the form of a solution, slurry, suspension or in solid aggregate state,
b) a thermal treatment of the nickel starting compound in a treatment zone by means of a pulsating flow at a temperature of from 200 to 550° C.,
c) the formation of nanocrystalline nickel oxide material,
d) the discharge of the nanocrystalline nickel oxide material obtained in steps b) and c) from the reactor.

It was surprisingly found that the method can be carried out at relatively low temperatures of from 200 to 550° C., particularly preferably from 230 to 500° C., quite particularly preferably from 250 to 480° C. Hitherto, preferred temperatures of more than 700° C., and indeed up to 1400° C., were known in the state of the art for similar methods.

Quite particularly surprisingly, it was found according to the invention that the crystallization process of the nickel oxide can be controlled in targeted manner by the method according to the invention, in particular the size of the crystallites and the pore-size distribution of the nickel oxide. These parameters can also be further advantageously influenced by the residence time in the flame or by the reactor temperature. The nanocrystalline nickel oxide particles that form are prevented from agglomerating by the pulsating thermal treatment. Typically, the nanocrystalline particles are immediately transferred through the stream of hot gas into a colder zone, where some of the nickel oxide crystallites are obtained with diameters of less than 20 nm.

In the case of the thus-obtainable nickel oxide crystallites, this leads to very high BET surface areas of >50 $m^2/g$, particularly preferably >100 $m^2/g$ and quite particularly preferably >150 $m^2/g$. In particular, nickel oxides with a BET surface area of up to 350 $m^2/g$, preferably 200 to 300 $m^2/g$ were able to be obtained according to the method according to the invention. The BET surface area is determined according to DIN 66132 (using the Brunauer, Emmett and Teller method).

It proved to be advantageous if the nickel starting material is ground to a particle diameter of <10 μm, preferably <5 μm, particularly preferably <2 μm and in particular <1 μm. The particle size is preferably determined by the Debye-Scherrer method with X-ray diffraction and the associated Rietveld refinement.

The method developed by Peter Debye and Paul Scherrer as well as, independently, by Albert Hull operates, not with monocrystals, but with powdery samples. The powder consists of a series of randomly arranged crystallites, with the result that the lattice planes are also arranged randomly in space and thus some crystallites always satisfy the Bragg reflection condition. In addition, the sample rotates about an axis perpendicular to the incident beam. Around the sample, cone-shaped shells form from X-rays which originate in the structural interference. A photographic film, on which the cone-shaped shells appear as reflexes, lies around the sample. The grazing angle θ can be calculated from the distances between the reflexes recorded on the film from the incident beam:

$$x/2\pi R = 4\theta/360°$$

The distance x of the diffraction reflex on the film from the incident beam behaves with respect to the circumference of the camera $x/2\pi R$ like the aperture angle of the corresponding diffraction cone with respect to 360°. Regarding the X-ray diffractometric Rietveld analysis, we also refer to R. Kriegel, Ch. Kaps, Thüringer Werkstofftag "Röntgendiffraktometrische Rietveld-Analyse von nanokristallinen Precursoren and Keramiken", Verlag Dr. Köster, Berlin 2004, pages 51-56, the disclosure of which is incorporated herein by reference.

A smaller particle size of the nickel starting material leads to a further increase in the specific surface area of the nickel oxide obtained according to the invention, wherein in contrast its residual carbon content decreases. This is due to the more rapid transport of heat into the inside of the particle during the conversion in the pulsating fluidized-bed reactor and thus the creation of the necessary conditions for a reaction conversion also in the particle itself and not just in the outer shell region.

The preferred particle size is preferably set by wet grinding, i.e. by grinding a suspension of the nickel starting compound in a dispersant. The grinding can for example take place in a ball mill, bead mill, beater mill, an annular gap mill or other mills known in the state of the art. A pretreatment of the suspension by means of a dispersant (for example Ultra-Turrax T50) prior to the grinding also proved advantageous.

In the method according to the invention, suspensions can be calcined within a very short period, typically within a few milliseconds, at comparatively lower temperatures than are usual with the known methods of the state of the art, without additional filtration and/or drying steps or without the addition of additional solvents. The nickel nanocrystallites that form have very large BET surface areas and, after a reduction to nickel metal, produce a nickel catalyst with increased reactivity, improved rate of conversion and improved selectivity.

The nearly identical residence time of every nickel oxide particle in the homogeneous temperature field created by the method results in an extremely homogeneous end product with narrow monomodal particle distribution. A device for carrying out the method according to the invention in the production of such monomodal nanocrystalline metal oxide powders is known for example from DE 101 09 892 A1. Unlike the device described there and the method disclosed there, the present method does not, however, require an upstream evaporation step in which the starting material, i.e. the nickel starting compound, is heated to an evaporation temperature.

The nickel starting compound from which the nickel oxide materials according to the invention are produced is inserted direct via a carrier fluid, in particular a carrier gas, preferably an inert carrier gas, such as for example nitrogen, argon, etc., into so-called reaction chambers, i.e. into the combustion chamber. Attached exhaust side to the reaction chamber is a resonance tube with a flow cross-section which is clearly reduced compared with the reaction chamber. The floor of the combustion chamber is equipped with several valves for the entry of the combustion air into the combustion chamber. The aerodynamic valves are fluidically and acoustically matched to the combustion chamber and the resonance tube geometry such that the pressure waves, created in the combustion chamber, of the homogeneous "flameless" temperature field spread pulsating predominantly in the resonance tube. A so-called Helmholtz resonator forms with pulsating flow with a pulsation frequency of between 3 and 150 Hz, preferably 10 to 110 Hz.

Material is typically fed into the reaction chamber either with an injector, with a suitable two-component nozzle, three-component nozzle or in a Schenk dispenser.

Preferably, the nickel starting compound is introduced into the reaction chamber in atomized form, with the result that a fine distribution in the region of the treatment zones is guaranteed.

An inorganic nickel salt is preferably used as nickel starting compound. Preferred nickel salts are nickel nitrate and a nickel hydroxide, also in the form of their hydrates. According to the invention, basic nickel carbonate in the form of a solution, suspension or paste can also be regarded as a nickel hydroxide.

In addition to the nickel starting compound further compounds, for example supports or precursors thereof (e.g. aluminium nitrate), binders and/or promoters, can also be atomized simultaneously with the nickel starting compound. For example, an aluminium compound can advantageously also be atomized in order to obtain a nickel-aluminium system which can be converted into a nickel-aluminium catalyst (comparable with Raney nickel) by reduction. It is also possible for example to atomize aluminium nitrate with a nickel starting compound, wherein through the calcining in the pulsation reactor a nickel oxide supported on aluminium oxide or a nickel-containing, Ni/Al mixed oxide can be obtained.

Other elements or compounds can also be used, in particular also promoters, such as e.g. the transition metals or aluminium. Preferred transition metals are W, Pd, Pt, Rh, Ru, Ag, Nb, Cu, Cr, Co, Mo, Fe and Mn. The promoters are preferably atomized and converted in the form of their salts together with the nickel starting material in the pulsation reactor. Following the production of the nickel oxide, the promoters can, however, also be introduced into the nickel oxide material in conventional manner, for example through a metal exchange or impregnation.

Nickel-containing mixtures or mixed compounds doped with the above-named promoters are very easily obtained by the above-described methods.

After the thermal treatment, the nanocrystalline nickel oxides (or nickel-containing mixtures or mixed compounds) that have formed are immediately transferred into a colder zone of the reaction chamber, if possible by means of the carrier fluid, with the result that they can be separated and discharged in the colder zone. The yield of the method according to the invention is almost 100%, as all of the product that forms can be discharged from the reactor.

Typically, the method is carried out at a pressure in the range of from normal pressure to approximately 40 bar.

A subject of the invention is furthermore the nanocrystalline nickel oxide material (or nickel-containing mixture or mixed compound) that can be obtained by the method according to the invention. It was found that the thus-obtainable nanocrystalline nickel oxide material preferably has a crystallite size in the range of from 4 nm to 100 µm, more preferably from 5 nm to 100 µm, quite particularly preferably 6 to 100 nm, which, as already stated above, can preferably be set by the pulsation of the thermal treatment. The particle size can be determined by XRD or TEM.

Furthermore, nickel oxide particles which have a BET surface area of preferably >50 $m^2$/g, particularly preferably >100 $m^2$/g and particularly preferably >150 $m^2$/g are obtained by the method according to the invention. In particular, nickel oxides with a BET surface area of up to 350 $m^2$/g, preferably from 200 to 300 $m^2$/g, were able to be obtained according to the method according to the invention. In the process, the residual carbon content falls to ≤50 wt.-%, preferably to ≤20 wt.-%. Particularly preferably, the residual carbon content is ≤7.5 wt.-%, still more preferably ≤3 wt.-% and in particular ≤1 wt.-%.

An advantage of the nickel oxide material according to the invention is that, after reduction to nickel metal, it can be used to replace Raney nickel and is at a much smaller risk of exploding. It is therefore extremely suitable for use on an industrial scale. After reduction to nickel metal, the nickel oxide material according to the invention is particularly well suited as hydrogenation catalyst, for example for the conversion or reduction of multiple-bond components, such as for example alkynes, alkenes, nitrides, polyamines, aromatics and substances of the carbonyl group. In addition, after reduction to nickel metal, heteroatom-heteroatom bonds of organic nitro compounds, for example nitrosamines, can be reduced with the nickel oxide compound according to the invention. The alkylation of amines, the amination of alcohols, a methanation, polymerization reactions or Kumada coupling represent further fields of use. Compared with Raney nickel, the NiO according to the invention shows better results after reduction in particular when hydrogenating C═C double bonds.

The nickel oxide material can be extruded with a suitable support material, for example aluminium oxide, and a suitable binder known per se to a person skilled in the art, for example boehmite or pseudoboehmite, to a shaped body. Likewise, an aluminium precursor, e.g. aluminium nitrate or peptized boehmite, which is converted together with the nickel starting compound according to the method according to the invention in the pulsation reactor can also be used. A thus-produced nickel mixed oxide or the oxidic mixture can then immediately be compressed into a desired shape, for example into a simple tablet form. The Ni/Al molar ratio is preferably matched to that of conventional nickel hydrogenation catalysts and is preferably 60:40 to 40:60, preferably 55:45 ($NiO/Al_2O_3$ in each case).

The invention will now be described in more detail with reference to the following embodiment examples, which are not to be understood as limiting. The device used, as already mentioned above, corresponds largely to the device described in DE 101 09 892 A1, with the difference that the device used for carrying out the method according to the invention had no preliminary evaporator stage.

EMBODIMENT EXAMPLES

Example 1

Production of NiO

Nickel nitrate in the form of an aqueous solution with a nickel content of 13 wt.-%, which was injected into the pulsating fluidized bed at different process temperatures, served as starting compound. The results are summarized in Table 1:

TABLE 1

| Test results - NiO from nickel nitrate solution | | |
|---|---|---|
| Test point | Process temperature | Specific surface area in ° C. (according to BET) in $m^2/g$ |
| 6 | 450 | 86 |
| 7 | 425 | 91 |
| 8 | 400 | 95 |
| 9 | 380 | 101 |
| 10 | 325 | 36 |

As the process temperature decreases, the specific surface area of the NiO produced increases up to a maximum at 380° C.; at still lower process temperatures, an incomplete substance conversion takes place—the product colour is then greenish, which is an indication of unconverted nickel nitrate and the specific surface area decreases.

Example 2

The test from Example 1 was repeated, wherein however an equimolar quantity of aluminium nitrate was also atomized simultaneously with the nickel nitrate in order to obtain an oxidic mixture of $Al_2O_3$ and NiO. The $NiO/Al_2O_3$ ratio was matched to that of typical hydrogenation catalysts and was 55:45.

The test was repeated, wherein peptized boehmite was used instead of aluminium nitrate.

For both mixed compounds, BET surface areas of 120 and 130 $m^2/g$ were obtained in two tests.

Example 3

Production of Nickel Oxide from a Nickel Hydroxide

Nickel hydroxide in the form of basic nickel carbonate $NiCO_3.2Ni(OH)_2$ from Aldrich was processed to a suspension. The average particle size of the solid is 5.4 µm. The solids content was set at 16% in the case of the nickel carbonate/nickel hydroxide suspension. The suspension was injected into the fluidized bed at a process temperature of 460° C. The analysis results are summarized in Table 2:

TABLE 2

| Test results of the production of nickel oxide from basic nickel carbonate $NiCO_3 \cdot 2 Ni(OH)_2$ | | | |
|---|---|---|---|
| Test point | Process temperature in ° C. | Specific surface area (according to BET) in $m^2/g$ | Total carbon $C_{total}$ in wt.-% |
| 11 | 460 | 62 | 0.2 |

The total carbon content of 0.2 wt.-% corresponds to the particularly preferred specification of the carbon content, which should preferably be less than 1 wt.-%. However, when basic nickel carbonate was used no mechanical pretreatment of the suspension was carried out.

Example 4

Reduction of the Process Temperature and Particle Size of the Starting Material

The nickel hydroxide ($NiCO_3.2Ni(OH)_2$) used has an average particle size of 5.4 µm. The complete thermal decomposition of such large raw material particles proves to be problematic in the pulsating fluidized bed because of the very short residence times. A complete conversion can be achieved only by increasing the process temperatures, wherein a more pronounced sintering thereby begins specifically in the region of the surface. This results in small specific surface areas.

Consequently, in this example, the particle size of the raw material was reduced by grinding. Smaller particle sizes lead to a reduced temperature gradient into the inside of the particle and thus to a better reaction conversion at already lower process temperatures in the hot gas.

For this, the nickel hydroxide ($NiCO_3.2Ni(OH)_2$) was mixed with distilled water to form a 40 wt.-% nickel carbonate suspension and mechanically treated 3× in an annular gap mill (Fryma Koruma, Type MS 12):

TABLE 3

| grinding of nickel hydroxide ($NiCO_3 \cdot 2 Ni(OH)_2$) in the annular gap mill | |
|---|---|
| Grinding process | Average particle size $d_{50}$ [µm] |
| Start | 5.4 |
| $1^{st}$ pass | 1.7 |
| $2^{nd}$ pass | 1.1 |
| $3^{rd}$ pass | 0.8 |

The solids concentration of the suspension obtained was then set at 16 wt.-% by adding water.

The system configuration as well as the set process parameters also corresponded to the settings of the previous examples. The test material (suspension) was introduced into the reactor by fine-particle spraying by means of a two-component nozzle with a feed quantity of 14 kg/h of suspension. The raw material suspension was stirred throughout the test, in order to prevent settling.

A process starting temperature of 450° C. was fixed for the $1^{st}$ test point. The process temperature was then reduced in 25 K steps until the total carbon content rose to values of >1 wt.-%. The aim of this was to determine the optimum specific surface area. The test results are summarized in Table 4:

TABLE 4

Test results - NiO from basic nickel carbonate

| Test point | Process temperature [° C.] | Specific surface area (according to BET) [m²/g] | Total carbon content $C_{total}$ [wt.-%] |
|---|---|---|---|
| 1 | 450 | 77 | 0.3 |
| 2 | 425 | 84 | 0.4 |
| 3 | 400 | 94 | 0.5 |
| 4 | 375 | 121 | 0.9 |
| 5 | 350 | 134 | 1.4 |

As can be seen from Table 4, it was possible to obtain a fine-particled NiO with a specific surface area of 121 m²/g and a total carbon content of <1 wt.-%. The maximum of the specific surface area was 134 m²/g for a somewhat higher total carbon content of 1.4 wt.-%.

Example 5

Production of Nickel Oxide from Basic Nickel Carbonate Paste

Basic nickel carbonate paste $Ni(OH)_2CO_3$ from OMG Kokkola Chemicals OY, which can be regarded as a nickel hydroxide compound, was used as nickel starting compound. It was possible to obtain a nickel oxide with the following specifications with this paste:

| | |
|---|---|
| Specific surface area according to BET: | 244 +/− 5 m²/g |
| Total carbon: | 1.0 +/− 0.05 wt.-% |
| Average particle size: | $d_{50}$ = 13 μm |
| Colour: | black |
| Crystallographic phase: | crystalline (XRD) |

Hydrogenation Tests:

In the following, the catalytic activity of various catalyst samples during the hydrogenation of α-methylstyrene, benzaldehyde and cinnamaldehyde was tested. In total, five samples were used, wherein Sample 1 is a pure nickel oxide and Samples 2-4 are nickel oxides which were obtained by jointly atomizing nickel nitrate and aluminium nitrate in the pulsation reactor.

In all cases, Raney nickel BK 111 W with a water content of approx. 50% (Degussa) served as comparison catalyst.

Example 6

Reduction of α-methylstyrene

Freshly distilled α-methylstyrene with a degree of purity of >99.0% was used in this hydrogenation test. 2-propanol (HPLC grade) served as solvent. Technical hydrogen gas 4.0 and technical nitrogen gas 4.0 from Siad were also used.

Before the hydrogenation of the α-methylstyrene, the nickel catalysts (Samples 1 to 5) were activated in a 200-ml glass apparatus according to the following program:

(1) Nitrogen flushing of the apparatus containing the catalyst for 30 minutes at a flow rate of 50 ml/min;
(2) Heating under nitrogen to 250° C. with a temperature rise of 5° C./min and a nitrogen flow rate of 50 ml/min;
(3) Replacing the nitrogen with hydrogen within 5 minutes at a flow rate of 50 ml/min;
(4) Increasing the temperature to 420° C. at 5° C./min and a hydrogen flow rate of 50 ml/min;
(5) Reducing the catalyst with hydrogen at 420° C. for 180 minutes at a hydrogen flow rate of 50 ml/min;
(6) Cooling to 25° C. within approx. 15 minutes at a hydrogen flow rate of 50 ml/min;
(7) Replacing hydrogen with nitrogen within 5 minutes at a flow rate of 50 ml/min;

The Raney nickel in the form of an aqueous suspension was washed three times with 2-propanol before the kinetic tests were carried out. The dry nickel content was calculated at 100 mg.

The kinetic measurements were carried out isothermally at 25° C. in a stirred autoclave under almost constant hydrogen pressure (0.15-0.14 MPa) in 2-propanol as solvent. All the measurements were carried out in the kinetic region.

The following quantities were used for the kinetic experiment.

| | |
|---|---|
| 1. α-methylstyrene: | 5.0 g |
| 2. 2-propanol: | 95 ml |
| 3. Nickel catalyst: | 100 mg |
| 4. Raney nickel: | 200 mg (wet catalyst, which has been washed with 2-propanol three times before use, the dry nickel content was calculated as 100 mg) |

The catalyst was introduced into the reactor as suspension with the 2-propanol and a solution of the α-methylstyrene in 2-propanol added to it. The ambient atmosphere of the reactor was replaced by nitrogen, wherein the autoclave was flushed with nitrogen three times and then with hydrogen three times. The beginning of the stirring was regarded as starting point for the kinetic experiment (t=0 min). At the instant when the reaction rate dropped sharply, the stirring was stopped. The hydrogenation was monitored by taking samples during the reaction, which were evaluated by GC/MS analysis. An 8.30m×0.25 mm×5 μm CP-Sil was used as column.

The results of the reduction can be found in the following Table 5.

TABLE 5

| Catalyst | Half-life of the α-methylstyrene hydrogenation $T_{0.5}$ [min] |
|---|---|
| Sample 1 | 88 |
| Sample 2 | 69 |
| Sample 3 | 34 |
| Sample 4 | 17 |
| Sample 5 | 9 |
| Raney nickel BK 111 W sample | 92 |

As can be seen from the results of the reduction of α-methylstyrene, the performance of all the nickel catalysts produced by reduction is better than that of Raney nickel BK 111 W customary in the trade.

Example 7

Reduction of Benzaldehyde

The catalyst activation took place analogously to that named in Example 6. 2-propanol was also used as solvent, and the technical gases hydrogen and nitrogen of purity 4.0 were likewise used in this test. The benzaldehyde to be reduced was freshly distilled, wherein a purity of >99.0% resulted.

The following quantities of the reagents were used:

| | |
|---|---|
| Benzaldehyde: | 5.0 g |
| 2-propanol: | 95 ml |
| Nickel catalyst: | 100 mg |
| Raney nickel: | 200 mg (wet catalyst, which has been washed with 2-propanol three times before use, the dry nickel content was calculated as 100 mg) |

Only Sample 3, which displayed an average performance in the previous test inside the nickel catalysts according to the invention, was used.

The reduction test took place analogously to that in Example 6.

The results of the reduction can be found in the following Table 6.

TABLE 6

| Catalyst | Half-life of the benzaldehyde hydrogenation $T_{0.5}$ [min] |
|---|---|
| Sample 3 | 12 |
| Raney nickel BK 111 W sample | 29 |

As can be seen from the table, Sample 3 shows a value improved by more than 50% compared with Raney nickel BK 111 W when reducing benzaldehyde.

Example 8

Reduction of Cinnamaldehyde

In the following test, cinnamaldehyde was reduced with Samples 3, 4 and 5 and once again Raney nickel BK 111 W was used as comparison. The preparation of samples of the catalysts took place analogously to that in Examples 6 and 7. Likewise, the reaction procedure was carried out analogously to that named in Examples 6 and 7.

The following quantities of the substances were used:

| | |
|---|---|
| Cinnamaldehyde: | 5.0 g |
| 2-propanol: | 95 ml |
| Nickel catalyst: | 100 mg |
| Raney nickel: | 200 mg (wet catalyst, which has been washed with 2-propanol three times before use, the dry nickel content was calculated as 100 mg) |

The results for cinnamaldehyde can be seen in the following Table 7:

TABLE 7

| Catalyst | Half-life of the cinnamaldehyde hydrogenation $T_{0.5}$ [min] |
|---|---|
| Sample 2 | 18 |
| Sample 3 | 10 |
| Sample 4 | 45 |
| Raney nickel BK 111 W sample | 49 |

As can be seen from the table, the catalysts according to the invention display much improved reactivities compared with Raney nickel BK 111 W in the case of the reduction of cinnamaldehyde.

The invention claimed is:

1. Method for the production of a nanocrystalline nickel oxide material comprising the steps of
   a) the introduction of a nickel starting compound into a reaction chamber by means of a carrier fluid, wherein the nickel starting compound is an inorganic nickel salt and wherein the nickel starting compound is introduced into the reaction chamber in the form of a solution, slurry, suspension or in solid aggregate state,
   b) a thermal treatment of the nickel starting compound in a treatment zone by means of a pulsating flow at a temperature of 200 to 550° C.,
   c) the formation of nanocrystalline nickel oxide material, and
   d) the discharge of the nanocrystalline nickel oxide material obtained in steps b) and c) from the reactor,
   wherein the inorganic nickel salt is selected from the group consisting of nickel nitrate, nickel hydroxide, and a basic nickel carbonate, and
   wherein the nickel starting compound has an average particle size of less than 10 µm and is obtained by grinding a suspension of the nickel starting compound.

2. Method according to claim 1, wherein, in addition to the nickel starting compound, further compounds are also used in the method.

3. Method according to claim 2, wherein the further compounds are supports or precursors thereof, binders and/or promoters.

4. Method according to claim 3, wherein aluminium or a transition metal is used as promoter.

5. Method according to claim 4, wherein the transition metal is selected from the group consisting of W, Pd, Pt, Rh, Ru, Ag, Nb, Cu, Cr, Co, Mo, Fe and Mn.

6. Nanocrystalline nickel oxide material obtained by the method according to claim 1 and having a BET surface area of more than 150 m²/q.

7. Nanocrystalline nickel oxide material according to claim 6, wherein the crystallite size of the nickel oxide lies in the range of from 5 nm to 100 µm.

8. Nanocrystalline nickel oxide material according to claim 6, having a residual carbon content of less than 50 wt.-%.

9. Nanocrystalline nickel oxide material according to claim 6, wherein the nickel oxide material is present in pure form, supported, as oxidic mixed compound or as nickel-containing mixture.

10. A method of performing a chemical conversion comprising providing a nanocrystalline nickel oxide material according to claim 6 as catalyst or catalyst precursor.

11. The method according to claim 10, wherein the chemical conversion is a hydrogenation, a methanation, an alkylation of amines, an amination of alcohols, a polymerization reaction or a Kumada coupling.

12. The method according to claim 10, wherein the nickel oxide material is reduced to metallic nickel.

13. Catalyst obtained by reduction of the nanocrystalline nickel oxide material according to claim 6.

14. A method for the production of a nanocrystalline nickel oxide material comprising:
   a) grinding a suspension of an inorganic nickel salt to obtain a nickel starting compound having an average particle size of less than 10 µm;
   b) introducing the nickel starting compound into a reaction chamber by means of a carrier fluid, wherein the nickel starting compound is provided in solution, as a slurry, in suspension or in solid aggregate state;
   c) thermally treating the nickel starting compound in a treatment zone by means of a pulsating flow at a temperature of 200 to 550° C. to form a nanocrystalline nickel oxide material; and,
   d) discharging the nanocrystalline nickel oxide material, wherein the inorganic nickel salt is selected from the group consisting of nickel nitrate, nickel hydroxide, and a basic nickel carbonate.

* * * * *

UNITED STATES PATENT AND TRADEMARK OFFICE
CERTIFICATE OF CORRECTION

PATENT NO. : 8,759,249 B2
APPLICATION NO. : 12/994963
DATED : June 24, 2014
INVENTOR(S) : H. Woelk et al.

Page 1 of 1

It is certified that error appears in the above-identified patent and that said Letters Patent is hereby corrected as shown below:

IN THE SPECIFICATION:

In Column 6:
Line 7: delete "($NiCO_3 . 2Ni (OH)_2$)" and insert -- ($NiCO_3 \cdot 2Ni (OH)_2$) -- therefor.
Line 38: delete "($NiCO_3 . 2Ni (OH)_2$)" and insert -- ($NiCO_3 \cdot 2Ni (OH)_2$) -- therefor.
Line 51: delete "($NiCO_3 . 2Ni (OH)_2$)" and insert -- ($NiCO_3 \cdot 2Ni (OH)_2$) -- therefor.

Signed and Sealed this
Thirtieth Day of December, 2014

Michelle K. Lee
*Deputy Director of the United States Patent and Trademark Office*